Sept. 3, 1935.  H. A. PALMER  2,013,576
COMBINED SUPPLY CONTROLLING AND FEED REGULATING APPARATUS
Filed May 31, 1934  3 Sheets-Sheet 1
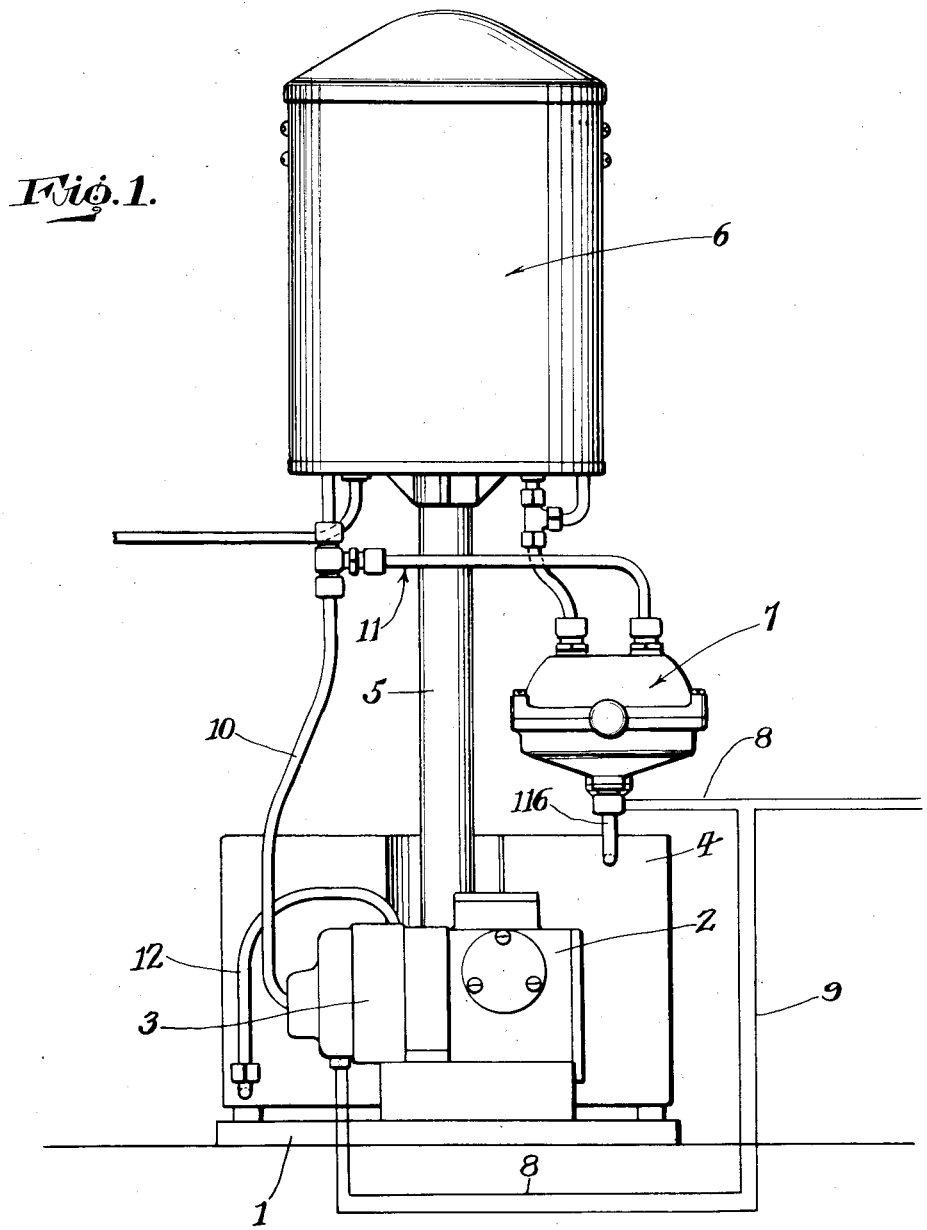
Inventor
Harry A. Palmer
By Geo. F. Kimmel
Attorney

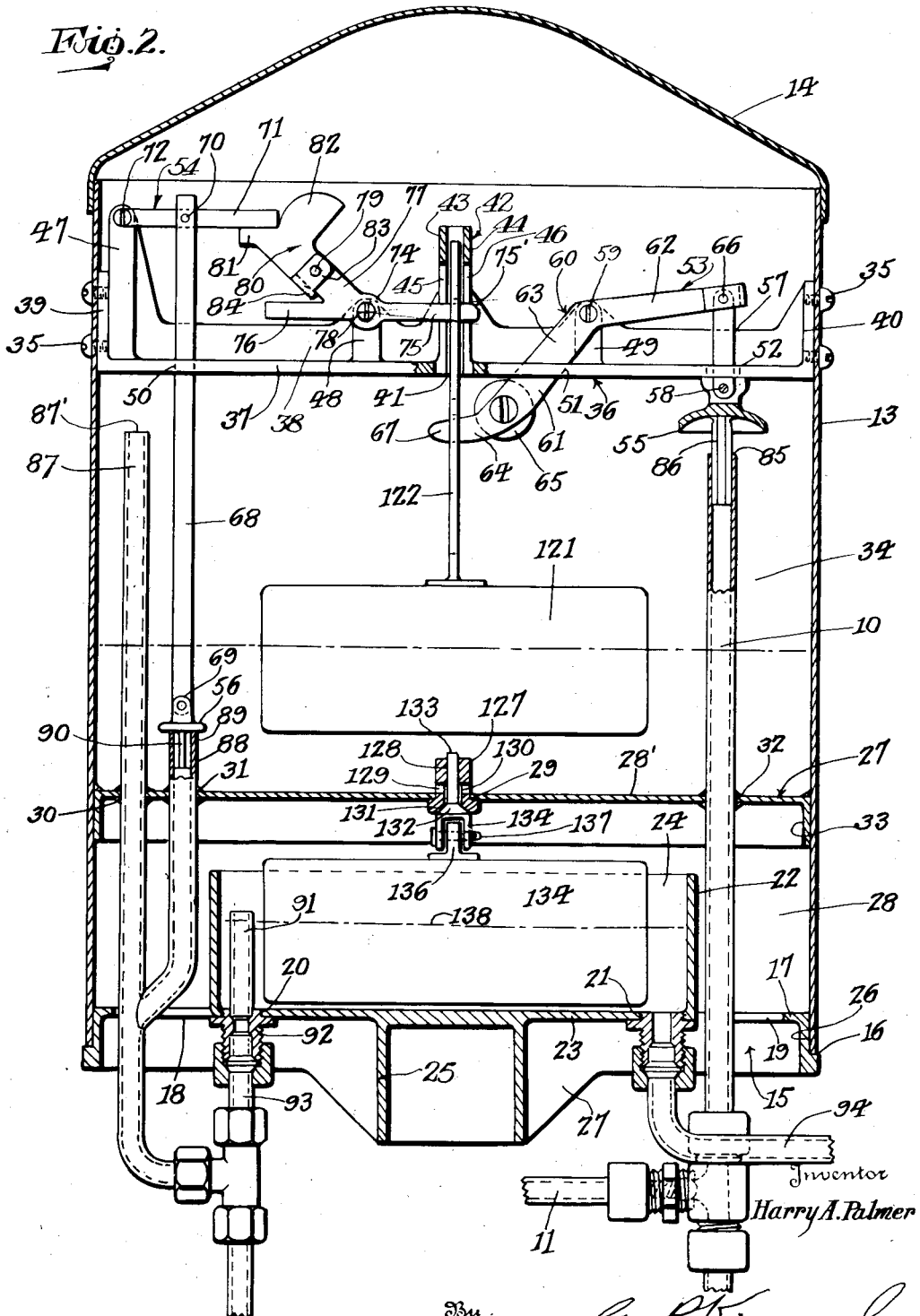

Sept. 3, 1935.  H. A. PALMER  2,013,576
COMBINED SUPPLY CONTROLLING AND FEED REGULATING APPARATUS
Filed May 31, 1934  3 Sheets-Sheet 3
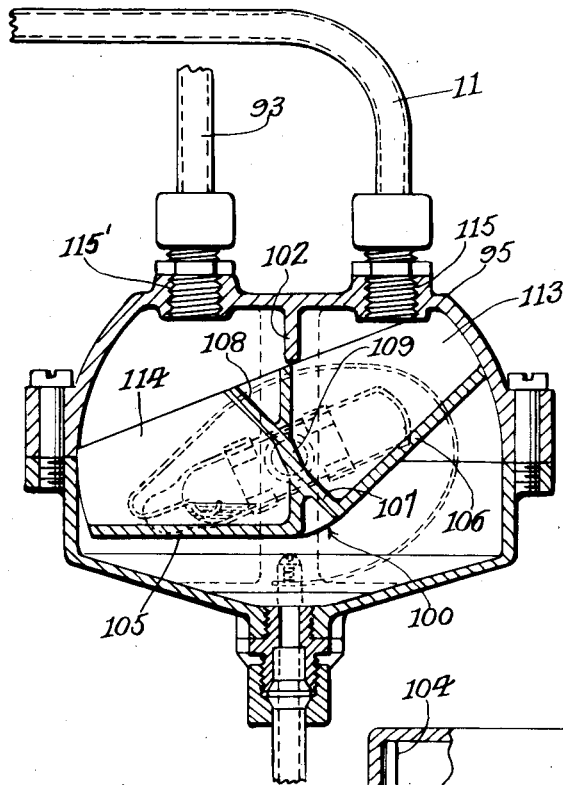
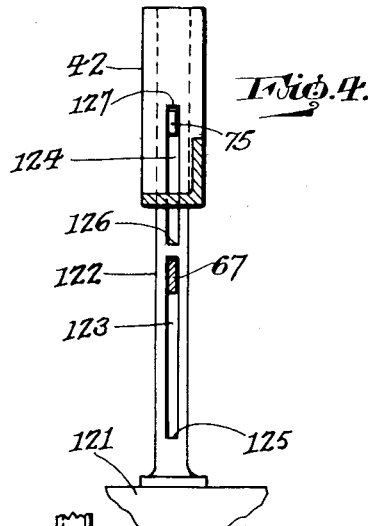
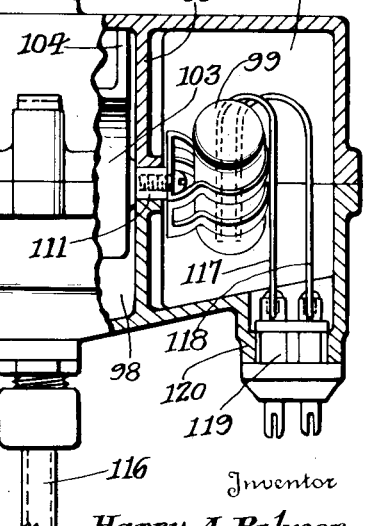
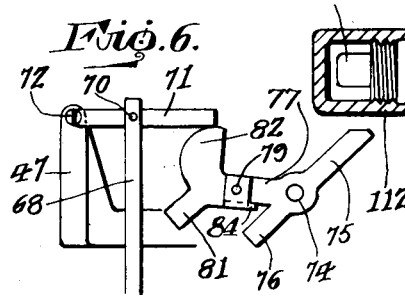
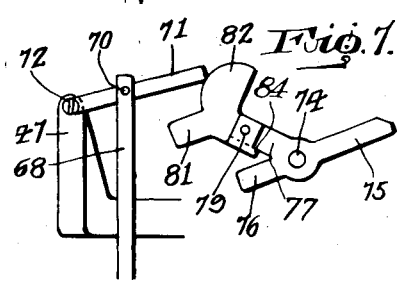
Inventor
Harry A. Palmer
By Geo. P. Kimmel
Attorney Patented Sept. 3, 1935

2,013,576

UNITED STATES PATENT OFFICE 2,013,576

COMBINED SUPPLY CONTROLLING AND FEED REGULATING APPARATUS

Harry A. Palmer, Malden, Mass., assignor to Palmer Inventions, Inc., Malden, Mass., a corporation of Massachusetts Application May 31, 1934, Serial No. 728,456

7 Claims. (Cl. 103—26)

This invention relates to a combined supply controlling and feed regulating apparatus designed primarily for use in connection with liquid fuel burners, but it is to be understood that the apparatus is to be employed in any connection for which it may be found applicable, and the invention has for its object to provide, in a manner as hereinafter set forth, an apparatus including a liquid receiving element, means for controlling the supply of liquid to said element and a service controlling element associated with the receiving element. The latter coacts with the service controlling element to provide for a constant gravity feed to a point of destination or consumption for the liquid, such as a liquid fuel burner, and the controlling means providing for the liquid to be intermittently supplied to the receiving element.

A further object of the invention is to provide, in a manner as hereinafter set forth, an apparatus of the class referred to including means controlled from an overflow of liquid for intermittently supplying liquid to a controllable liquid receiving element and with said means acting to return the overflow operating it to the source from which the liquid is taken by said means to supply the receiving element.

A further object of the invention is to provide, in a manner as hereinafter set forth, an apparatus of the type referred to including a liquid supply pump, a controllable liquid receiving element for intermittently receiving charges of liquid from the pump, means for closing said element to the pump at the end of each charging period, means for utilizing the liquid forced from the pump at the end of such period to make the pump inactive, and means for utilizing a portion of the charge to make the pump active for a follower charge for said element.

A further object of the invention is to provide, in a manner as hereinafter set forth, a combined supply controlling and feed regulating apparatus for interposition in a liquid feed line functioning to maintain a perfect controlled gravity feed at all times to a point of destination or consumption.

A further object of the invention is to provide, in a manner as hereinafter set forth, a unit formed of a tank constituting a liquid reservoir, an electrically operated liquid supply pump communicating with the tank, an electric motor for operating the pump, a liquid receiving element arranged above the tank, motor and pump for intermittently receiving charges of liquid from the pump, a power line, a switch interposed in the line, a liquid counter-balanced structure arranged between the tank and said element for opening and closing the switch to provide for the intermittent operation of the pump, a supply line leading from the pump to the receiving element, a feed element associated with said receiving element, and means for establishing communication between the structure and the supply line, the structure and the receiving element, and the structure and the tank to provide respectively for the operation of the structure in one direction by liquid from the supply line to the switch, the operation of the structure in the opposite direction by liquid from the receiving element to close the switch and the conducting of the liquid supplied to said structure from the latter to the tank.

Further objects of the invention are to provide, in a manner as hereinafter set forth, a combined supply controlling and feed regulating apparatus for liquids which is comparatively simple in its construction and arrangement, strong, durable, compact, thoroughly efficient in its use, readily assembled, and comparatively inexpensive to set up.

To the above ends essentially, and to others which may hereinafter appear, the invention consists of such parts and such combination of parts which fall within the scope of the invention as claimed.

In the drawings:

Figure 1 is a front elevation of the combined supply controlling feed regulating apparatus.

Figure 2 is a vertical sectional view of the liquid receiving element looking from the rear.

Figure 3 is a vertical sectional view of the switching structure.

Figure 4 is a front elevation, broken away, of the switching structure.

Figure 5 is a detail partly in section.

Figures 6 and 7 are fragmentary views illustrating positions of the shifting member of one of the float controlled valve shifting mechanisms associated with the receiver element.

The apparatus is in the form of a unit including a base 1, a pump 2, a motor 3 for operating pump 2, a tank 4 constituting a reservoir for the liquid, a pedestal 5 extending upwardly from base 1, a combined liquid receiving and service mechanism 6 secured upon the top of pedestal 5, a liquid operated switching structure 7 interposed between tank 4 and mechanism 6 and communicating with the latter and with tank 4, power line conductors 8, 9 leading to motor 2, a feed line 10 leading from pump 2 to mechanism 6, a valve controlled by-pass 11 extending from feed line 10 to structure 7, and a supply line 12 leading from tank 4 to pump 2. The structure 7 is interposed in conductor 8. The pump 2 and motor 3 are supported upon the front of base 1. The tank 4 is supported upon the rear of base 1. The pedestal 5 is interposed between pump 2 and tank 4, and the latter as shown is of semi-annular form to provide a clearance for the pedestal. The supply line 12 leads from the lower portion of one end of tank 4. The by-pass 11 is normally closed to line 10 by its controlling valve.

The mechanism 6 with reference to Figures 2 and 4 includes a vertical casing formed of a cylindrical body part 13 provided at its upper end with a removable closure 14. Arranged within and extended from the lower end of part 13 is an inverted cup-shaped circular member 15 provided with an annular shoulder 16 near the bottom of its outer periphery. Member 15 extends up into and snugly bears against the inner face of part 13, and the bottom edge of the latter seats upon shoulder 16. The top 17 of member 15 has a pair of spaced aligning slots 18, 19 disposed at its diametric center and a pair of spaced aligning openings 20, 21 aligning with the slots 18, 19. The walls of the openings are threaded. Formed integral with the upper face of member 15 and arranged between slot 18 and opening 20 and between slot 19 and opening 21 is a vertically disposed annulus 22 which in connection with the part 23 of top 17 provides a lower combined liquid receiving and float chamber 24. A socket forming means 25 depends from and is disposed centrally with respect to the lower face of said part 23. Depending from the top 17 and integral with the outer periphery of the means 25, as well as with the inner face of the body 26 of member 15 are spaced reinforcing webs 27.

Anchored to the body part 13 and arranged within the latter at a point between its transverse median and lower end is an inverted cup-shaped circular partition member 27 which is spaced from and forms in connection with member 15 a compartment 28 in which is arranged the float chamber 24, the latter being of less height than that of compartment 28. The top 28' of member 27 is formed with an axial opening 29 and also a row of aligning openings 30, 31 and 32 disposed at the diametric center thereof. The opening 29 is arranged between openings 31, 32. The opening 30 is positioned outwardly with respect to but arranged in close proximity to opening 31. The openings 31, 32 are arranged equidistant from the body 33 of member 27 and from opening 29. The openings 30, 31 are arranged to align with slot 18 and the opening 32 aligns with slot 19. The member 27 provides the casing with an upper combined liquid receiving and float chamber 34.

Disposed diametrically of the upper portion of chamber 34 and anchored to body part 13 by the holdfast devices 35 is a cross head 36 formed of a horizontally disposed part 37, a vertically disposed part 38 integral at its lower end with one side of part 37 and vertically disposed end portions 39, 40. The part 37 at its transverse center is formed with a horizontal slot 41. Formed integral with the parts 37, 38 at the transverse center of the cross head 36 is a vertically disposed channel-shaped enlargement 42, open at each end, registering at its lower end with slot 41 and extending above part 38. Opposed side walls 43, 44 of enlargement 42 are lengthwise slotted, as at 45, 46 respectively. Formed integral with the end portion 39 and one end of part 38 is a vertical support 47 of greater height than end portion 39. Formed integral with one of the vertical faces of part 38 and aligning with support 47 is a pair of spaced enlargements 48, 49 arranged adjacent the side walls 43, 44 respectively of the enlargement 42. The enlargement 49 is arranged a greater distance from wall 44 than the distance between enlargement 48 and wall 43. The part 37 is formed with an opening 50 in proximity to support 47, a slot 51 in proximity to wall 44 and an opening 52 in proximity to end portion 40. The end walls of slot 51 are beveled.

Arranged within the upper portion of chamber 34 is a pair of float controlled valve shifting mechanisms 53, 54 for a pair of closure valves 55, 56 respectively for shutting off respectively intake and for controlling discharge of liquid to and from chamber 34.

The mechanism 53 includes a vertically movable link 57 which operates through opening 52 and is pivotally connected at its lower end, as at 58 to closure 55. Pivotally connected, as at 59 to the upper end of enlargement 49 is a two arm lever 60. The arms of the latter are indicated at 61 and 62. The arm 61 is of greater length than the arm 62 and is formed of upper and lower parts 63, 64 disposed at an angle with respect to each other. The part 63 is disposed at an inclination with respect to pivot 59 and extends downwardly through slot 51. The part 64 is curved and extends in a direction towards the center of chamber 34, as well as across the vertical axis of the latter. The part 64 is of less length than part 63 and carries a weighting means 65 for normally maintaining lever 60 in the position shown in Figure 2, that is to say, in a position whereby the closure 55 is elevated to non-closing position. The normal position of arm 62 with respect to pivot 59 is that it extends slightly upward at an inclination from its inner end. The outer end of arm 62 is pivotally connected as at 66 to the upper end of link 57. The lower end terminal position of arm 61 and which extends across the vertical axis of chamber 34 is indicated at 67. The mechanism 54 includes a vertically movable elongated link 68 which is pivotally connected at its lower end, as at 69, to the valve 56. The link 68 extends through the opening 50, and is pivotally connected at its upper end, as at 70, to a horizontally disposed lever 71 intermediate the ends of the latter. The lever 71 is arranged over crosshead 36 and has its outer end pivotally connected, as at 72, to the upper end of support 47.

The mechanism 54 also includes a three arm controlling lever 74. The arms of the latter are indicated at 75, 76 and 77. The lever 74 is pivotally connected to the upper end of enlargement 48, as at 78. The arms 75 and 76 are arranged in endwise opposed alignment. The arm 75 is of greater length than arm 76, extends toward the center of and across the vertical axis of chamber 34. The arm 77 is disposed at an upward and outward inclination with respect to pivot 78 and is arranged over arm 76. The free end of arm 75 has a beveled upper corner 75'. Pivotally mounted upon the upper end of arm 77, as at 79 and extended upwardly and outwardly therefrom is an angle-shaped shifting member 80 for the lever arm 71. The member 80 includes a rectangular intermediate leg 81, an upper leg 82 and a lower leg 83. The legs 82, 83 are disposed respectively at obtuse angles with respect to the inner end of leg 81. The outer edge of leg 82 is substantially of convex curvature and its inner edge straight. The outer edge of leg 82 is for riding against the inner lower corner of lever 71 for the purpose of elevating the latter on its pivot to raise the link 68 and in this connection see Figure 7. The inner end, lower end and upper end respectively of the legs 81, 82 and 83 merge into each other. The leg 83 is formed with an extension 84 at its lower end to provide a stop which coacts with the lower side edge of arm 77. The top edge of leg 81 normally opposes the bottom edge of lever arm 71. The leg 81 forms a combined support and stop for lever 71. The inner end edge of lever arm 71 normally opposes the lower portion of the outer side edge of leg 82. The arm 75 corresponds in weight to the combined weight of arms 76, 77 and member 80.

The manner in which the mechanisms 53, 54 are shifted to close valve 55 and to open valve 56 will be hereinafter referred to.

Extending up through the member 27 into chamber 34 and to a point in proximity to cross head 36 is the feed line or pipe 10 which is normally open at its outlet or upper end 85 and functions on the operation of the pump 2 to feed the oil or liquid into the chamber 34. Operating in the said outlet end 85 is the fluted stem 86 of the closure valve 55 for said outlet. Extending up through the member 27 into the chamber 34 and to a point in proximity to the cross head 36 is an overflow pipe 87 having its upper or intake end 87' permanently open. Extending up through the member 27 into the chamber 34 to a point a short distance above member 27 is an oil or fluid conducting off pipe 88 which has its upper or intake end 89 normally closed by valve 56. The latter has a fluted stem 90 which is arranged within the upper end of pipe 88. The lower end of the latter at a point below member 27 opens into the overflow pipe 87. Extending upwardly into the float chamber 24 is a vertically disposed overflow pipe 91 having its upper end permanently open and arranged below the top of chamber 24. The pipe 91 is attached at its lower end to a tubular coupling 92 which extends into opening 20 and is secured to member 15. Connected with the pipe 91 by the coupling 92 is a fluid conducting off line 93 which leads to structure 7. The overflow pipe 87 opens into the line 93.

Extending into opening 21 and secured to member 15, as well as communicating with chamber 24 is a service line 94 for feeding the oil to its point of destination or consumption.

The pipe or line 10 passes through slot 19. The pipes 88, 89 pass through slot 18. The pipe 10 is of the same capacity as are the pipes 87, 88 and 91.

The structure 7 comprises a sectional housing 95 provided with a partition 96 forming a pair of chambers 97, 98 the former being for housing a mercoid switch 99 and the latter for housing a liquid or oil operated rocking device 100 for connection to and for opening and closing the switch 99. The top wall 101 of chamber 98 is provided centrally thereof with a depending web 102. The device 100 includes a body part 103 formed of a pair of side walls 104, a bottom consisting of a pair of spaced oppositely disposed sections 105, 106 inclining upwardly from the inner to the outer ends thereof and merging into the bottoms of said side walls, an inverted lower V-shaped web 107 integral with the inner ends of said sections and the lower part of the inner faces of said side walls, an upper V-shaped web 108 integral with the upper part of the inner faces of said side walls, a coupling web 109 merging into the inner faces of the side walls and connecting the top of web 107 to the bottom of web 108, trunnions 110 and 111 extending outwardly from the outer faces of and disposed at the vertical center of said side walls. The trunnion 110 is journaled in and extends from one end of housing 95 so access can be had thereto. The trunnion 111 is journaled in partition 96 and has the switch 99 connected thereto. The outer end of trunnion 110 is threaded for securing therewith a removable protecting cap 112 therefor.

The structural arrangement of the device 100 provides it in the form of a liquid or oil dumping receiver pivotally suspended in chamber 98 and formed with a pair of compartments or buckets 113, 114 each open at its top and outer end. The by-pass 11 is connected to the top of housing 95 at a point, as at 115, for discharging into compartment 113. The line 93 is connected to the top of housing 95 at a point, as at 115', for discharging into compartment 114. The web 102 coacts with one of the legs of web 108 for separating compartment 113 from compartment 114 and the web 102 coacts with the other leg of web 108 for separating compartment 114 from compartment 113 during the oscillating or rocking of device 100. The liquid or oil when discharged into each compartment will be dumped therefrom after device 100 is shifted in one direction or the other by the weight of the oil or liquid. Each compartment is extended upwardly at an inclination with respect to the trunnions to receive the liquid or oil. The weight of the latter discharged into a compartment will lower such compartment, elevate the other and the compartment lowered by the weight of the liquid or oil will dump the latter into chamber 98 from where it is conducted off by the pipe 116 which communicates with chamber 98 and opens into the tank 4. The bottom 117 of housing 95 slopes toward the intake of pipe 116. The trunnion 111 provides for the shifting of the switch 99 to open and closed position depending upon the direction of movement of such trunnion caused by the rocking in opposite directions of device 100.

Circuit connections controlled by the switch 99 are indicated at 117, 118 and a plug 119 is employed for electrically coupling the conductor 8 to said circuit connections. The housing 95 at its bottom is formed with a socket 120 to receive plug 119. When compartment 113 of device 100 is lowered by the weight of the liquid or oil supplied thereto the switch 99 will be moved to open position and the operation of the pump will be discontinued. When compartment 114 of device 100 is lowered by the weight of the liquid or oil supplied thereto the switch 99 will be moved to closed position causing the operation of the pump. The manner in which the liquid or oil is conducted to compartments 113, 114 for lowering them will be hereinafter referred to.

Operating in chamber 34 is a float 121 provided with a vertically disposed oblong stem 122 formed with a pair of lengthwise extending slots 123, 124 (Figure 4). The slot 123 is of greater length than slot 124 and arranged below the latter. The stem 122 extends up through slot 41 and into the slotted channel-shaped enlargement 42. The lower terminal portion 67 of lever 60 extends through slot 123. The arm 75 of lever 74 extends through enlargement 42 and slot 124. The portion 67 of lever 60 is arranged in the path of the bottom wall 125 of slot 123 whereby on the upward movement of the float 121 which carries stem 122 therewith wall 125 will engage portion 67 and rock lever 60 on its pivot in a direction to lower link 57 for moving valve or closure 55 to a position to close the outlet end 85 of line 10. The free end of lever arm 75 is arranged in the path of the bottom wall 126 of slot 124 whereby when stem 122 is elevated such wall will engage lever arm 75 and cause lever 74 and member 80 to assume the position shown in Figure 6.

With respect to the operation of the apparatus, it will be assumed that the liquid fuel is rising in the chamber 34 and that lever 74 is in the position shown in Figure 2. The float rises until wall 126 engages the under side of lever arm 75. Further movement of the float causes 75 to swing counter-clockwise upward and pivot point 79 moves downward, member 80 pivoting clockwise with respect to pivot 79, while the outer surface of arm 82 slides beneath arm 71 without moving the latter. Towards the end of the upward movement of the float, the upper surface of arm 82 moves below arm 71, and member 80 swings counter-clockwise on 79 until 84 rests under arm 77, as shown in Figure 6. Valve 56 would have remained closed during all this time, while during the last part of the rise of float 121, valve 55 would have been closed by lever arm 62. With both valves 55 and 56 closed, liquid from the pump by-passes into pipe 11 and chamber 113, tilting 100 and breaking the motor circuit. As the float lowers, wall 125 moves away from arm 67 and valve 55 is almost immediately opened, due to weight 65 moving lever arm 62 upward. During this time the combined weight of lever 71, rod 68 and valve 56 maintains lever 75 in the position shown in Fig. 6. When the float has lowered so that wall 127 of rod 122 engages the upper surface of lever arm 75, the latter follows the descent of the float, and the upper surface of member 82 raises arm 71 to open valve 56 (see Fig. 7). This allows liquid from tank 34 to enter chamber 114, rocking member 100 to start the pump (Fig. 3). While the pump is starting up, the float 121 continues to lower, due to the flow of liquid through pipes 88 and 129, and surface 82 passes out of contact with lever 71, permitting the latter to drop and close valve 56, as seen in Fig. 2. As the liquid level rises due to the operation of the pump, this cycle is repeated.

The compartment 114 of device 100 will receive liquid or oil when pipe 88 is open. Such compartment being in an elevated position the weight of such liquid or oil supplied to compartment 114 will rock device 100 in a direction to elevate compartment 113 and to close switch 99 to provide for the operation of the pump to feed liquid or oil to chamber 34. The compartment 113 of device 100 when in an elevated position receives liquid or oil from the by-pass 11 and the weight of such liquid or oil will rock device 100 in a direction to elevate compartment 114 and to open the switch 99 whereby the operation of the pump will be discontinued. When the outlet of line 10 is closed by valve 55 and the pump is still operating, a pressure will be built up in line 10 thereby opening the by-pass valve and whereby the liquid or oil will be caused to travel from line 10 through the by-pass for discharge into compartment 113 to lower the latter thereby rocking device 100 in a direction to open the switch 99 resulting in the discontinuing of the operation of the pump and supply to chamber 34.

The pipes 87, 88, 91 and 93 may all be connected to pump starting chamber 114. Any excessive oil from these pipes would flow back to supply tank by way of return pipe 116.

Secured to partition 28' and extending upwardly through opening 29 is a vertically disposed ported, chambered, flanged casting 127 formed in its upper portion with a bore 128. The casting provides a valve housing which is formed with ports and a valve chamber indicated at 129, 130 respectively. The bore 128 and ports 129 open into chamber 130. The bottom of casting 127 is beveled to provide a valve seat 131 at the lower end of chamber 130. The ports 129 and chamber 130 establish communication between chambers 34 and 24 and communication is controlled between chambers 34 and 24 by a valve 132 coacting with seat 131. Extending upwardly from valve 132 and through bore 128 is a stem 133. Depending from valve 132 is an inverted yoke 134.

Arranged within chamber 24 is a vertically movable float 135 for controlling valve 132 to maintain the liquid supplied to chamber 24 at a constant level resulting in a constant gravity feed through service line 94 to the point of destination or consumption. The float 135 is formed with a stem 136 which is arranged within and pivotally connected, as at 137 to the yoke 134. The constant level of the liquid within chamber 24 is indicated by dotted line 138. This level drops about .001" to provide for the liquid from chamber 34 which seeps past valve seat 131 into chamber 24 maintaining a constant liquid level in the latter. The chamber 24 is of materially less area than chamber 34.

What I claim is:—

1. A combined supply controlling and feed regulating apparatus for liquids comprising a liquid storage tank, a pump, an electric motor for operating the pump, a power line, a liquid counterbalancing switch structure interposed in said line for alternately opening and closing it to the motor, a feed line leading from said storage tank to the pump, a combined liquid receiving and liquid feed regulating mechanism, controllable means operable automatically in accordance with variations in liquid level in said mechanism for establishing communication between said mechanism and structure for conducting liquid to the latter for operating said structure to close the power line to the motor, a supply line leading from the pump to said mechanism, controllable means operable automatically in accordance with variations in liquid level in said mechanism for closing the supply line to said mechanism during the operation of the pump, valve controlled means for establishing communication between said supply line and structure when the supply line is closed for conducting liquid from the latter to said structure for operating said structure to open the power line to the motor, and means for permanently establishing communication between said structure and storage tank for conducting the liquid from the former to the latter.

2. A combined supply controlling and feed regulating apparatus for liquids comprising a liquid storage tank, a pump, an electric motor for operating the pump, a power line, a liquid counterbalancing switch structure interposed in said line for alternately opening and closing it to the motor, a feed line leading from said storage tank to the pump, a combined liquid receiving and liquid feed regulating mechanism, controllable means for establishing communication between said mechanism and structure for conducting liquid to the latter for operating said structure to close the power line to the motor, a supply line leading from the pump to said mechanism, controllable means for closing the supply line to said mechanism during the operation of the pump, valve controlled means for establishing communication between said supply line and structure when the supply line is closed for conducting liquid from the latter to said structure for operating said structure to open the power line to the motor, means for permanently establishing communication between said structure and storage tank for conducting the liquid from the former to the latter, and said mechanism including a buoyant structure common to and operating said pair of controllable means and acting upon the controllable means associated with the supply line in advance of the said other controllable means.

3. In a combined supply controlling and feed regulating apparatus for liquids, a liquid receiving element, a liquid fuel supply line leading from a source of supply and opening into said element, a liquid fuel conducting-off line leading from said element, controlling means for said element operable automatically in accordance with variations in liquid level in said element for closing and opening the supply line and for opening and closing the conducting-off line, said means including a plural lever mechanism for operating an opening and closing device for the conducting-off line and a single lever for operating an opening and closing device for the supply line, means for directing an overflow from the supply line when the latter is closed, and means controlled from the conducted-off liquid from said element and an overflow from said supply line for intermittently supplying liquid to said element, said last-named means including a discharge line for conducting the said conducted-off-liquid and the said overflow supplied thereto to the source from which the liquid was taken by said means to supply said element.

4. In a combined supply controlling and feed regulating apparatus, comprising a combined liquid receiving and feed regulating structure including a chamber for receiving the liquid, a feed regulating element communicating with said chamber, a valve controlled liquid fuel supply line leading from a source of supply and opening into said chamber, a valve controlled liquid fuel conducting-off line leading from said chamber, controlling means operable automatically in accordance with variations in liquid level for closing and opening said supply line and for opening and closing said conducting-off line, said means including a plural lever mechanism carrying a link for operating the controlling valve of the conducting-off line and a lever carrying a link for operating the controlling valve of the supply line, means for directing an overflow from said supply line when the latter is closed, and means controlled from the liquid conducted off from said chamber and the overflow from said supply line for intermittently supplying liquid to said chamber, said last-named means including a discharge line for returning said conducted-off liquid and the overflow supplied thereto to the source from which the liquid was taken by said means to supply said chamber.

5. In a combined supply controlling and feed regulating apparatus, comprising a combined liquid receiving and feed regulating structure including a chamber for receiving the liquid, a feed regulating element communicating with said chamber, a valve controlled liquid fuel supply line leading from a source of supply and opening into said chamber, a valve controlled liquid fuel conducting-off line leading from said chamber, controlling means operable automatically in accordance with variations in liquid level for closing and opening said supply line and for opening and closing said conducting-off line, said means including a plural lever mechanism carrying a link for operating the controlling valve of the conducting-off line and a lever carrying a link for operating the controlling valve of the supply line, means for directing an overflow from said supply line when the latter is closed, means controlled from the liquid conducted off from said chamber and the overflow from said supply line for intermittently supplying liquid to said chamber, said last-named means including a discharge line for returning said conducted-off liquid and the overflow supplied thereto to the source from which the liquid was taken by said means to supply said chamber, and said means including an electrically driven pump communicating with said source and an element alternately shiftable in opposite directions by said conducted-off liquid and the overflow supplied to said means for alternately opening and closing a switch in a power line circuit for the pump.

6. A combined liquid supply controlling and feed regulating apparatus comprising a liquid containing tank constituting a reservoir, an electrically operated supply pump communicating with said tank, an electric motor for operating the pump, a liquid receiving element for intermittently receiving charges of liquid from the pump, a power line leading to the motor, a switch interposed in said line, a liquid counterbalanced structure for opening and closing the switch, a gravity liquid feeding element coacting with and supported from said receiving element, a supply line leading from the pump to the receiving element, means including float controlled valves for establishing respectively communication between said structure and supply line, between said structure and the receiving element and between the structure and the tank to provide respectively for the operation of the structure in one direction by the liquid from the supply line to open the switch, the operation of the structure in the opposite direction by liquid from the receiving element to close the switch and the conducting of the liquid supplied to said structure from the latter to the tank.

7. A combined liquid supply controlling and feed regulating apparatus comprising a liquid containing tank constituting a reservoir, an electrically operated supply pump communicating with said tank, an electric motor for operating the pump, a liquid receiving element for intermittently receiving charges of liquid from the pump, a power line leading to the motor, a switch interposed in said line, a liquid counterbalanced structure for opening and closing the switch, a gravity liquid feeding element coacting with and supported from said receiving element, a supply line leading from the pump to the receiving element, means including float controlled valves for establishing respectively communication between said structure and supply line, between said structure and the receiving element and between the structure and the tank to provide respectively for the operation of the structure in one direction by the liquid from the supply line to open the switch, the operation of the structure in the opposite direction by liquid from the receiving element to close the switch and the conducting of the liquid supplied to said structure from the latter to the tank, said structure supported from the tank, and a support common to the motor, tank, pump and receiving element.

HARRY A. PALMER.